(12) United States Patent
Shindo

(10) Patent No.: US 6,865,592 B1
(45) Date of Patent: Mar. 8, 2005

(54) AUTOMATIC TRANSACTION SYSTEM

(75) Inventor: Yasutoshi Shindo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/540,987

(22) Filed: Mar. 31, 2000

(30) Foreign Application Priority Data

Nov. 11, 1999 (JP) .......................... 11-320939

(51) Int. Cl.$^7$ .......................... G06F 15/16
(52) U.S. Cl. .................. 709/203; 709/221; 714/4; 714/18
(58) Field of Search .............. 714/4, 10, 18, 714/55–56; 709/203, 217, 218, 220–221, 250, 1; 705/42–43, 73, 1; 902/8–21

(56) References Cited

U.S. PATENT DOCUMENTS 5,805,829 A * 9/1998 Cohen et al. ............... 709/202
6,185,695 B1 * 2/2001 Murphy et al. ............. 714/4
6,311,165 B1 * 10/2001 Coutts et al. ............... 705/21
6,360,366 B1 * 3/2002 Heath et al. ............... 717/178
6,519,627 B1 * 2/2003 Dan et al. .................. 709/203
6,598,023 B1 * 7/2003 Drummond et al. ........ 705/1

* cited by examiner

Primary Examiner—Larry D. Donaghue
(74) Attorney, Agent, or Firm—Venable LLP; Michael A. Sartori; Daniel G. Vivarelli

(57) ABSTRACT

An automatic transaction apparatus develops applications on a Web basis. The automatic transaction apparatus is provided with a local AP program resident therein which can implement transactions identical to those executed by an AP program downloaded from a Web server. Upon detection of a failure caused by the Web, the monitor program transitions the processing to the local AP program, thereby rapidly taking appropriate actions in the event of a failure caused by the Web.

5 Claims, 2 Drawing Sheets

AUTOMATIC TRANSACTION SYSTEM

BACKGROUND OF THE INVENTION

1. Field of the Invention

The present invention relates to an automatic transaction system in which applications executed by an automatic transaction apparatus are developed on a Web basis, such that the automatic transaction apparatus downloads an appropriate application from a Web server to make a transaction.

2. Description of Related Art

An automatic transaction apparatus may be installed, for example, in financial institutions for allowing customers to make transactions such as cash deposit and withdrawal, and so on through their manipulations on the apparatus. Associated with such automatic transaction apparatus, a Web-based automatic transaction system is contemplated. Specifically, applications for executing transactions are developed on a Web basis, and stored in a Web server. An automatic transaction apparatus, which has a Web browser installed therein, connects to the Web server through a network to download an appropriate application from the Web server, upon execution of a transaction. Then, the automatic transaction apparatus runs the application to make the transaction.

In such an automatic transaction system, where an automatic transaction apparatus downloads an application executed thereby from a Web server to make a transaction, if a failure occurs due to the Web environment on the automatic transaction apparatus side, such as halting of the Web browser, or if a failure occurs due to the Web environment on the Web server side, such as shut-down of the server or congestion on the network, the automatic transaction apparatus cannot download applications required to operate. Therefore the automatic transaction apparatus halts the process. If the automatic transaction apparatus stops, customers cannot be serviced. In addition, when such an automatic transaction apparatus is installed in an unmanned branch, service personnel cannot provide service to customers. Thus, there is a challenge to provide an automatic transaction system which is capable of obviating any failure caused by the Web environment as well as rapidly taking appropriate actions in case such a failure occurs.

OBJECT AND SUMMARY OF THE INVENTION

To solve the problems mentioned above, according to a first aspect of the present invention, an automatic transaction system includes a Web server and an automatic transaction apparatus connected to the Web server such that the automatic transaction apparatus downloads an application from the Web server to make transactions, wherein the automatic transaction apparatus comprises an application resident therein for realizing transactions identical to transactions executed by the application downloaded from the Web server, so that the automatic transaction apparatus switches to the resident application to make a transaction when the application cannot be downloaded from the Web server.

According to a second aspect of the present invention, in the automatic transaction system of the present invention, the automatic transaction apparatus saves, as a transaction is being processed, information required for the application to execute the transaction, and passes the saved information to the resident application to continue the transaction when the application cannot be downloaded from the Web server.

According to a third aspect of the present invention, an automatic transaction system includes a Web server and an automatic transaction apparatus connected to the Web server such that the automatic transaction apparatus downloads an application from the Web server to make transactions, wherein automatic transaction apparatus periodically checks a Web environment, and maintains an environment which allows the automatic transaction apparatus to download the application from the Web server.

According to a fourth aspect of the present invention, in the automatic transaction system of the present invention, the automatic transaction apparatus is rebooted while no transaction is being made to maintain an environment in which the application can be downloaded from the Web server.

According to a fifth aspect of the present invention, in an automatic transaction system of the present invention, the automatic transaction apparatus reboots the Web browser of the automatic transaction apparatus to maintain an environment in which the application can be downloaded from the Web server.

According to a sixth aspect of the present invention, in the automatic transaction system of the present invention, the automatic transaction apparatus reboots the Web browser while the automatic transaction apparatus disables a transaction executed with the application downloaded from the Web server.

According to a seventh aspect of the present invention, in the automatic transaction system of the present invention, the automatic transaction apparatus disables a transaction executed with the application downloaded from the Web server when a failure occurs in the Web server, not related to a Web environment of the automatic transaction apparatus, continues a periodic check on the Web environment, and provides the transaction when the Web server is recovered from the failure.

DETAILED DESCRIPTION OF THE PREFERRED EMBODIMENTS

Figure 1:
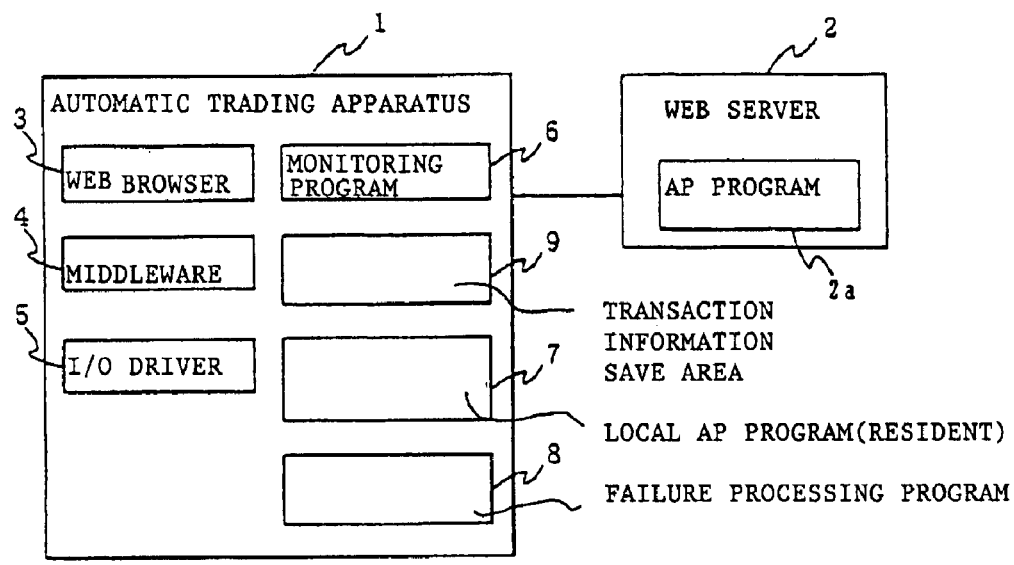
FIG. 1 is a block diagram illustrating a first embodiment of an automatic transaction system according to the present invention.

FIG. 1 is a block diagram illustrating a first embodiment of an automatic transaction system according to the present invention.

Referring specifically to FIG. 1, an automatic transaction apparatus 1 allows a customer to make transactions such as cash deposit and withdrawal, and so on through manipulations on the apparatus 1. The hardware constituting the automatic transaction apparatus 1 comprises a note accepting and dispensing machine for accepting and dispensing notes; a coin accepting and dispensing machine for accepting and dispensing coins; a display for providing a variety of information for guiding manipulations; a touch panel provided for a customer to enter information such as a personal identification number, the amount of money to be withdrawn, and so on as well as to select one transaction from several transactions; a card processing machine for receiving a customer's card to read information stored on a magnetic stripe of the card, and so on; a deposit book processing machine for receiving a customer's deposit book for printing or the like; a journal printer for printing transaction details and journal information on a slip and issuing the transaction details slip to the customer.

A Web server 2 is connected to the automatic transaction apparatus 1 through a network such as LAN or the like. The Web server 2 stores an application (AP) program 2a required to execute a transaction with the automatic transaction apparatus 1, and contents or the like which may be provided to a customer for example from the display of the automatic transaction apparatus 1.

A Web browser 3 installed in the automatic transaction apparatus 1 downloads the AP program 2a from the Web server 2, and displays associated images on the display. The Web browser 3 also detects when downloading of the AP program 2a has timed out.

A middleware 4 installed in the automatic transaction apparatus 1 provides respective functions used by the AP program 2a which has been downloaded by the Web browser 3 from the Web server 2.

An I/O driver 5 installed in the automatic transaction apparatus 1 is a driver for the AP program 2a to drive the note accepting and dispensing machine and so on through an I/O interface.

A monitoring program 6 installed in the automatic transaction apparatus 1 monitors the Web browser 3. The monitoring program 6 detects a failure of the Web browser 3, such as incomplete downloading of the Web browser 3, and detects through a notice from the Web browser 3 that downloading of the AP program 2a has timed out.

A local AP program 7 installed in the automatic transaction apparatus 1 is an AP program which can execute the same functions as those available by the AP program 2a downloaded from the Web server 3, and is resident on the automatic transaction apparatus 1. The local AP program 7 is executed in place of the AP program 2a in the event of a failure in the Web browser 3, such as incomplete downloading of the Web browser 3, or when the AP program 2a cannot be downloaded due to an overload on the network, or the Web server 2 going down, even if the Web browser 3 is normal.

A failure processing program 8 installed in the automatic transaction apparatus 1 is executed when the automatic transaction apparatus 1 fails to take actions against the failure such as returning a medium such as a card or the like of a customer received in the automatic transaction apparatus 1, recording a failure log, and so on. The AP program 2a downloaded from the Web server 2 also includes a failure processing program, so that the failure processing program in the AP program 2a is generally executed if a failure such as jammed notes during conveyance or the like, not caused by the Web, occurs in the course of a transaction using the downloaded AP program 2a. On the other hand, the failure processing program 8 is executed upon occurrence of a failure caused by the Web, such as imcomplete downloading of the Web browser 3.

The local AP program 7 and the failure processing program 8 are not produced as Web basis programs.

A transaction information save area 9 is reserved on a memory, not shown, in the automatic transaction apparatus 1 for saving information on a transaction under progress by the AP program 2a.

Next, the operation of the first embodiment will be described.

Generally, the automatic transaction apparatus 1, when instructed to execute a transaction through manipulations of a customer, downloads the AP program 2a, as required, from the Web server 2 in accordance with the progress of the transaction. The AP program 2a downloaded to the automatic transaction apparatus 1 controls hardware associated therewith through the middleware 4 and the I/O driver 5.

Then, the AP program 2a saves information required to continue the transaction with the local AP program 7, which would takeover the transaction if a Web related failure occurs, in the transaction information save area 9, in accordance with the progress of the transaction. The required information may include transaction information such as the classification of the transaction, and the type of medium used in the transaction such as a card and a deposit book; customer entered information such as stripe information of the card, a personal identification number, the amount of withdrawn money, and so on; a progress page; and so on. The information saved in the transaction information save area 9 is cleared once the associated transaction is completed.

The monitoring program 6 monitors whether or not the Web browser 3 fails, due to incomplete download or the like, in the course of a transaction. Upon detection of a failure in the Web browser 3, when the monitoring program 6 determines from information saved in the transaction information save area 9 that the transaction can be continued, it references a progress page saved in the transaction information save area 9, and jumps the transaction to pertinent processing within the local AP program 7 which is resident in the automatic transaction apparatus 1.

When the Web browser 3 is normally operating, the monitoring program 6 monitors whether or not the downloading of the AP program 2a has timed out. Upon detecting that the downloading of the AP program 2a has timed out, the Web browser 3 notifies this to the monitoring program 6. Upon detection of the time-out during the downloading of the AP program 2a, when the monitoring program 6 determines from information saved in the transaction information save area 9 that the transaction can be continued, it references a progress page saved in the transaction information save area 9, and jumps the transaction to pertinent processing within the local AP program 7 which is resident in the automatic transaction apparatus 1. As mentioned above, since the local AP program 7 is not built on a Web basis, the transaction can be continued by the local AP program 7 even if the Web browser 3 fails, or the downloading of the AP program 2a has timed out.

Upon detecting a failure in the Web browser 3 or upon detecting the time-out during the downloading of the AP program 2a, if the monitoring program 6 determines from the information saved in the transaction information save area 9 that the transaction cannot be continued, it executes the failure processing program 8 to take appropriate actions in response to the failure, such as returning a medium such as a card used in the automatic transaction apparatus 1, recording a failure log, and so on. It should be noted that the failure processing can be executed even during a failure of the Web browser 3, since the failure processing program 8 is not built on a Web basis, just like the local AP program 7, as mentioned above.

In a system which has an automatic transaction apparatus and Web server interconnected such that the automatic transaction apparatus downloads an AP program from the Web server to execute a transaction, if a Web browser fails to download, the AP program cannot be downloaded, so that a transaction under progress, if any, cannot be continued. In addition, since an associated failure processing program is included in the AP program downloaded from the Web server, any action to cope with a failure could not be performed.

Also, even if the Web browser is normally operating, congestion on a network, shut-down of the Web server, or a failure in a program in the Web server would cause the AP program to time out. If the next AP program cannot be downloaded, a transaction under progress cannot be continued. In addition, since a failure processing program is included in the AP program downloaded from the Web server, any action to cope with a failure could not be performed.

To solve such problems, according to the first embodiment of the present invention, the automatic transaction apparatus 1 is equipped with the monitoring program 6 for monitoring the Web browser 3; the transaction information save area 9 for saving information on a transaction under progress by the downloaded application program; the local AP program 7 capable of implementing functions similar to those available by the AP program 2a downloaded from the Web server 2; and the failure processing program 8 for taking appropriate actions in response to a possible failure. The transaction information save area 9 is reserved in a memory of the automatic transaction apparatus 1 for saving information on a transaction under progress by the AP program 2a, such that if the monitoring program 6 detects a failure caused by the Web while the automatic transaction apparatus 1 is making a transaction with the AP program 2a downloaded from the Web server 2, the automatic transaction apparatus 1 executes the local AP program 7 to continue the transaction, if it determines from information in the transaction information save area 9 that the transaction can be continued. In this way, a customer can complete the transaction, thereby improving customer service. Conversely, if the transaction cannot be continued, the automatic transaction apparatus 1 executes the failure processing program 8 to interrupt the transaction without service personnel who should otherwise deal with the customer, by returning the customer's card or the like without having the customer wait, thus likewise resulting in an improvement in customer service.

Here, in the first embodiment, the local AP program 7 is installed for continuing a transaction. While this improves the customer service as mentioned above, an update in the AP program 2a in the Web server 2 must reflect to the local AP program 7, which may be laborious for banking organizations.

To eliminate this inconvenience, it is contemplated to provide an embodiment which does not install the local AP program 7 or reserve the transaction information save area 9 for saving information required by the local AP program 7. In this embodiment, if a Web related failure occurs, appropriate actions can be taken in response to the failure even though a transaction under progress cannot be continued, without having a customer wait for a long time, so that the financial institution can be less burdened while maintaining a certain degree of customer service. Then, if the automatic transaction apparatus 1 can be recovered from the failure after the transition to the failure processing, the customer service can be improved. The recovery processing after the transition to the failure processing will be described later.

Figure 2:
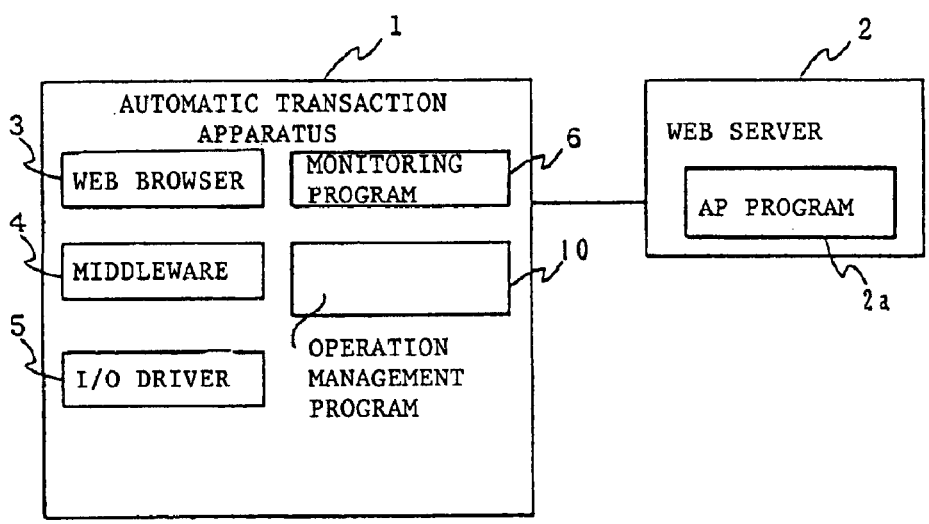
FIG. 2 is a block diagram illustrating a second embodiment of an automatic transaction system according to the present invention.

FIG. 2 is a block diagram illustrating a second embodiment of the automatic transaction system according to the present invention.

Referring specifically to FIG. 2, an automatic transaction apparatus 1 allows a customer to make a transaction such as cash deposit and withdrawal, and so on through manipulation on the apparatus 1. The hardware constituting the automatic transaction apparatus 1 comprises a note accepting and dispensing machine for accepting and dispensing notes; a coin accepting and dispensing machine for accepting and dispensing coins; a display for providing a variety of information for guiding manipulations; a touch panel provided for a customer to enter information such as a personal identification number, the amount of money to be withdrawn, and so on as well as to select one from several transactions; a card processing machine for taking a card of the customer thereinto to read stripe information of the card, and so on; a deposit book processing machine for taking a deposit book of the customer thereinto for printing and so on; a journal printer for printing transaction details and journal on a slip and issuing the transaction details slip to the customer.

A Web server 2 is connected to the automatic transaction apparatus 1 through a network such as LAN or the like. The Web server 2 stores an application (AP) program 2a required to execute a transaction with the automatic transaction apparatus 1; contents and so on which may be provided to customers from the display of the automatic transaction apparatus 1 or the like.

A Web browser 3 installed in the automatic transaction apparatus 1 downloads the AP program 2a from the Web server 2, and displays associated images on the display. The Web browser 3 also detects when downloading of the AP program 2a has timed out.

A middleware 4 installed in the automatic transaction apparatus 1 provides respective functions used by the AP program 2 which has been downloaded by the Web browser 3 from the Web server 2.

An I/O driver 5 installed in the automatic transaction apparatus 1 is for the AP program 2a to drive the note accepting and dispensing machine and so on through an I/O interface.

A monitoring program 6 installed in the automatic transaction apparatus 1 monitors the Web browser 3. The monitoring program 6 detects a failure of the Web browser 3, such as incomplete downloading of the Web browser 3, and the amount of memory leakage of the Web browser 3, as well as detectinh, through a notice from the Web browser 3, that downloading of the AP program 2a has timed out.

An operation management program 10 installed in the automatic transaction apparatus 1 manages operations executed by each software installed in the automatic transaction apparatus 1. The operation management program 10 senses the state of the automatic transaction apparatus 1 such as the course of a transaction, a failutr state, waiting for a customer to select a transaction, and so on, and instructs the monitoring program 6 to monitor the Web browser 3. In addition, the operation management program 10 instructs the automatic transaction apparatus 1 to reboot the Web browser 3 or the like.

Next, the operation of the second embodiment will be described.

When the automatic transaction apparatus 1 is operated for a long time, the Web browser 3 may sometimes experience a memory leakage. However, since the memory leakage gradually reserves the memory, so that the memory will not be reserved in such a degree that it suddenly affects the operation of the automatic transaction apparatus 1. Therefore, the monitoring program 6 monitors the amount of memory leakage of the Web browser 3, and when the amount of memory leakage exceeds a threshold value which has been preset within a range in which the amount of memory leakage will not affect the operation of the automatic transaction apparatus 1, the monitoring program 6 notifies the operation management program 10 to that effect.

The operation management program 10 manages the automatic transaction apparatus 1 as to whether it is in use for a transaction by a customer, or it is waiting for a transaction selection, and suspends any instructions from the monitoring program 6 while the automatic transaction apparatus 1 has a transaction under progress.

Upon detecting that the automatic transaction apparatus 1 is in a transaction selection waiting state, the operation management program 10 reboots the system of the automatic transaction apparatus 1 to release a memory leakage. This can prevent the system of the automatic transaction apparatus 1 from falling into a suspended or halted state due to the memory leakage.

In the second embodiment, Web server 2 and the Web browser 3 are periodically checked during a transaction selection waiting state. Therefore, it is possible to prevent a failure from occurring while a customer is making a transaction with the automatic transaction apparatus 1.

Specifically, the operation management program 10 periodically checks the monitoring program 6 even during a transaction selection waiting state. In response, the monitoring program 6 notifies the operation management program 10 of the presence or absence of incomplete downloading and/or memory leakage of the Web browser 3.

Also, the monitoring program 6 instructs the Web browser 3 to monitor the Web server 2 based on the result of the periodic check from the operation management program 10. The Web browser 3 can monitor the presence or absence of a failure in the Web server 2, and a network use situation, for example, as to whether or not a timing-out has occured, when it is free from hanging or memory leakage, and notifies the monitoring program 6 of the result. The monitoring program 6 notifies the operation management program 10 of the result of the check performed by the Web browser 3 on the Web server 2 as well.

If any Web related failure is detected as the result of the check mentioned above, such as hanging of the Web browser 3, shut-down of the Web server 2, or the like, appropriate post-processing is performed.

As a method of starting the post-processing, a customer can select a reduction in Web-based transactions or a cancellation of a transaction. For example, in a system in which only applications such as an application to supply information, not associated with main business, are built as Web basis applications, the operation management program 10 reduces the Web-based transactions. Conversely, when main operations are performed by Web basis applications, a transaction under progress is canceled. After the post-processing, recovery processing is performed, as will be later described.

As described above, in the second embodiment, the Web browser 3 periodically checks the Web environment to detect the occurrence of a Web related failure, or to detect beforehand any event which can lead to a failure. Then, the operation management program 10 reboots the system or reduces a transaction, making use of a transaction selection waiting state of the automatic transaction apparatus 1, thereby preventing a transaction from being interrupted immediately after a customer has started the transaction, or in the course of the transaction, so that the customer will not be annoyed.

Figure 3:
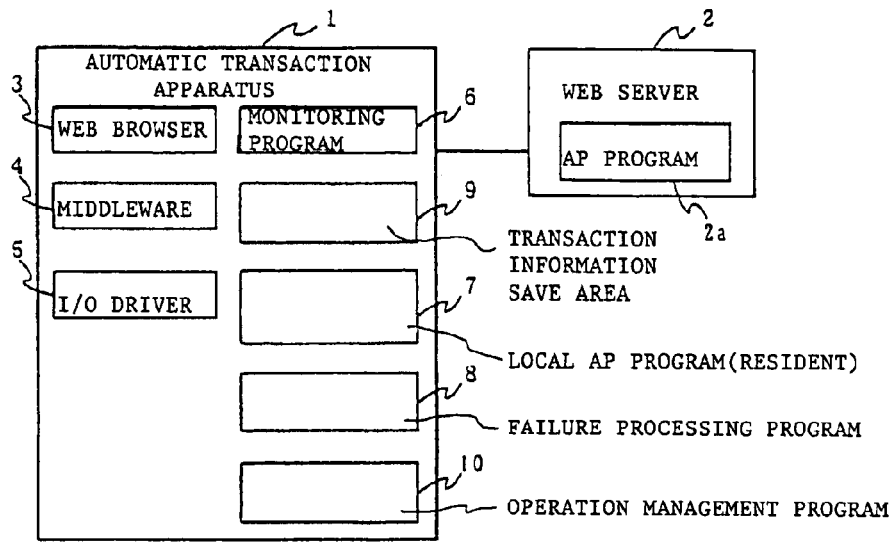
FIG. 3 is a block diagram illustrating a third embodiment of an automatic transaction system according to the present invention.

FIG. 3 is a block diagram illustrating a third embodiment of the automatic transaction system according to the present invention.

Referring specifically to FIG. 3, an automatic transaction apparatus 1 allows a customer to make a transaction such as a cash deposit and withdrawal, and so on through manipulation on the apparatus 1. The hardware constituting the automatic transaction apparatus 1 comprises a note accepting and dispensing machine for accepting and dispensing notes; a coin accepting and dispensing machine for accepting and dispensing coins; a display for providing a variety of information for guiding manipulations; a touch panel provided for a customer to enter information such as a personal identification number, the amount of money to be withdrawn, and so on as well as to select one transaction from among several transactions; a card processing machine for receiving a card of the customer to read stripe information of the, card, and so on; a deposit book processing machine for receiving a deposit book of the customer for printing or the like; a journal printer for printing transaction details on a slip and issuing the transaction details slip to the customer.

A Web server 2 is connected to the automatic transaction apparatus 1 through a network such as LAN or the like. The Web server 2 stores an application (AP) program 2a required to execute a transaction with the automatic transaction apparatus 1; contents and so on which may be provided to customers from the display of the automatic transaction apparatus 1 or the like.

A Web browser 3 installed in the automatic transaction apparatus 1 downloads the AP program 2a from the Web server 2, and displays associated images on the display. The Web browser 3 also detects when downloading of the AP program 2a has timed out.

A middleware 4 installed in the automatic transaction apparatus 1 provides respective functions used by the AP program 2 which has been downloaded by the Web browser 3 from the Web server 2.

An I/O driver 5 installed in the automatic transaction apparatus 1 is for the AP program 2a to drive the note accepting and dispensing machine and so on through an I/O interface.

A monitoring program 6 installed in the automatic transaction apparatus 1 monitors the Web browser 3. The monitoring program 6 detects a failure of the Web browser 3 itself, such as incomplete downloading of the Web browser 3, and the amount of memory leakage of the Web browser 3, as well as detecting, through a notice from the Web browser 3, that downloading of the AP program 2a has timed out.

A local AP program 7 installed in the automatic transaction apparatus 1 is an AP program which can execute the same function as those available by the AP program 2a downloaded from the Web server 3, and is executed in place of the AP program 2a in the event of a failure in the Web browser 3, such as incomplete downloading of the Web browser 3, or when the AP program 2a cannot be downloaded due to an overload on the network, the Web server 2 going down, even if the Web browser 3 is normal.

A failure processing program 8 installed in the automatic transaction apparatus 1 is executed when the automatic transaction apparatus 1 fails to take action against the failure such as returning a medium or the like such as a card of a customer received in the automatic transaction apparatus 1, recording a failure log, and so on. The AP program 2a downloaded from the Web server 2 also includes a failure processing program, so that the failure processing program in the AP program 2a is generally executed if a failure such as jammed notes, during conveyance or the like, not caused by the Web, occurs in the course of a transaction using the downloaded AP program 2a. On the other hand, the failure processing program 8 is executed upon occurrence of a failure caused by the Web, such as incomplete downloading of the Web browser 3.

Here, the local AP program 7 and the failure processing program 8 are not created on a Web basis.

A transaction information save area 9 is reserved on a memory, not shown, in the automatic transaction apparatus 1 for saving information on a transaction under progress by the AP program 2a.

An operation management program 10 installed in the automatic transaction apparatus 1 manages operations executed by each software installed in the automatic transaction apparatus 1. The operation management program 10 senses the state of the automatic transaction apparatus 1 such as conducting a transaction, a failing state, waiting for a customer to select a transaction, and so on, and instructs the monitoring program 6 to monitor the Web browser 3. In addition, the operation management program 10 instructs the automatic transaction apparatus 1 to reboot the Web browser 3 or the like.

Next, the operation of the third embodiment will be described.

Figure 4:
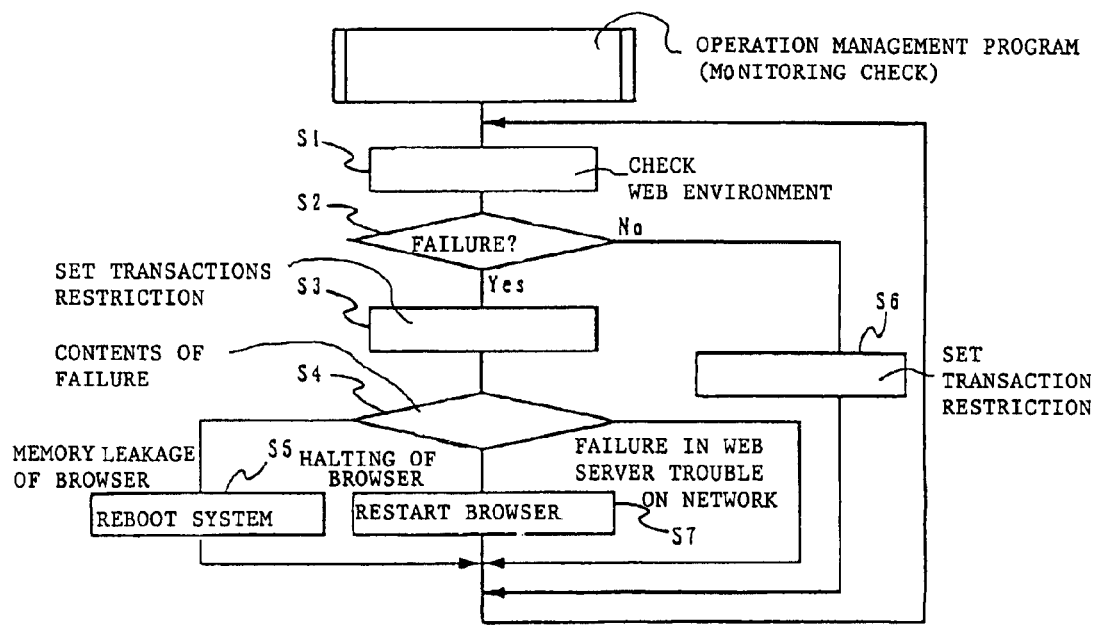
FIG. 4 is a flow chart illustrating the flow of processing according to the third embodiment.

FIG. 4 is a flow chart illustrating the flow of processing in the third embodiment. This flow chart illustrates the flow of the monitoring in a transaction selection waiting state, and the recovery processing.

The operation management program 10 performs a periodic check on the monitoring program 6 in a transaction selection waiting state (S1). In response, the monitoring program 6 notifies the operation management program 10 of the presence or absence of incomplete downloading and/or memory leakage of the Web browser 3.

Also, the monitoring program 6 instructs the Web browser 3 to monitor the Web server 2 based on the result of the periodic check from the operation management program 10. The Web browser 3 can monitor the presence or absence of a failure in the Web server 2, and a network use situation, for example, as to whether or not timing-out occurs, when it is free from hanging or memory leakage, and notifies the monitoring program 6 of the result. The monitoring program 6 notifies the operation management program 10 of the result of the check performed by the Web browser 3 on the Web server 2 as well.

If any Web related failure is detected as the result of a previous check as mentioned above, such as hanging of the Web browser 3, shut-down of the Web server 2, or the like (S2), appropriate post-processing is performed as previously described in the second embodiment (S3).

When a customer selects a transaction through manipulation of the automatic transaction apparatus 1 while the periodic check shows that the system is normal, the system of the automatic transaction apparatus 1 switches from the transaction selection waiting state to a transaction processing state.

Generally, the automatic transaction apparatus 1, when instructed to execute a transaction by manipulations of a customer, downloads the AP program 2a, as required, from the Web server 2 in accordance with the progress of the transaction. The AP program 2a downloaded to the automatic transaction apparatus 1 controls hardware associated therewith through the middleware 4 and the I/O driver 5.

Then, the AP program 2a saves information required to continue the transaction with the local AP program 7, which would takeover the transaction if a Web related failure occurred, in the transaction information save area 9, in accordance with the progress of the transaction. The required information may include transaction information such as classification of the transaction, and the type of medium used in the transaction such as a card and a deposit book; customer entered information such as stripe information of the card, a personal identification number, the amount of withdrawn money, and so on; a progress page; and so on. The information saved in the transaction information save area 9 is cleared once the associated transaction is completed.

The monitoring program 6 monitors whether or not the Web browser 3 fails due to incomplete downloading in the course of a transaction. Upon detection of a failure in the Web browser 3, when the monitoring program 6 determines from information saved in the transaction information save area 9 that the transaction can be continued, it references a progress page saved in the transaction information save area 9, and jumps the transaction to pertinent processing within the local AP program 7 which is resident in the automatic transaction apparatus 1.

When the Web browser 3 is normally operating, the monitoring program 6 monitors whether or not the downloading of the AP program 2a has timed out. Upon detecting that the downloading of the AP program 2a has timed out, the Web browser 3 notifies this to the monitoring program 6. Upon detection of the timing-out of the downloading of the AP program 2a, when the monitoring program 6 determines from information saved in the transaction information save area 9 that the transaction can be continued, it references a progress page saved in the transaction information save area 9, and jumps the transaction to pertinent processing within the local AP program 7 which is resident in the automatic transaction apparatus 1. As mentioned above, since the local AP program 7 is not built on a Web basis, the transaction can be continued by the local AP program 7 even if the Web browser 3 fails, or the downloading of the AP program 2a has timed out.

Upon detecting the failure in the Web browser 3 or upon detecting the timing-out of the downloading of the AP program 2a, if the monitoring program 6 determines from the information saved in the transaction information save area 9 that the transaction cannot be continued, it executes the failure processing program 8 to take appropriate action to the failure, such as returning a medium such as a card received in the automatic transaction apparatus 1, recording a failure log, and so on. It should be noted that the failure processing can be executed even during a failure of the Web browser 3, since the failure processing program 8 is not built on a Web basis just like the local AP program 7 as mentioned above.

As described above, when a failure occurs during a transaction, but the local AP program 7 takesover the transaction and has completed the transaction, or when a failure occurring during a transaction does not permit the transaction to continue and results in a transition to the failure processing, and the failure processing has been completed, the post-processing is performed as is the case of the detection of a failure by a previous check (S3).

The post-processing is performed when a Web related failure has occurred and before recovery processing is executed therefor. Specifically, when applications associated with main business are built on a Web basis, the operation management program 10 stops the operation associated with the transaction, as a transaction restriction. On the other hand, in the case where only applications such as an application to supply information, not associated with main business, are built as Web basis applications, the operation management program 10 deletes the display of a selection key associated with the transaction to reduce this Web-based transaction, as a transaction restriction.

By thus performing the post-processing to restrict available transactions, transactions available to customers in the absence of Web access, if any, can be kept available even before the recovery processing, thereby making it possible to reduce an inoperative time period of the automatic transaction apparatus 1.

Then, the operation management program 10 performs the recovery processing in accordance with the type a failure. Specifically, when the Web browser 3 has halted (S4), the operation management program 10 instructs the monitoring program 6 to restart the Web browser 3. The monitoring program 6 forcibly terminates the Web browser 3, and restarts the Web browser 3 (S7). Upon completion of the start, the monitoring program 6 notifies the operation management program 10 to that effect.

The operation management program 10 again starts the periodic check (S1), and releases the stopped operation or reduction if the Web browser 3 is normally operating as a consequence of the restart (S6).

When the Web browser 3 experiences a memory leakage (S4), the system of the automatic transaction apparatus 1 is likely to halt, so that the automatic transaction apparatus 1 is stopped as a result of the transaction restriction at S3 irrespective of applications provided by the Web. Then, the operation management program 10 reboots the system of the automatic transaction apparatus 1 (S5). After restarting the system, the operation management program 10 again starts the periodic check (S1), and releases the stopped operation if the automatic transaction apparatus 1 is normally operating as a consequence of the restart (S6).

With a failure in the Web server 2 or a failure on a network (S4), the operation management program 10 continually performs the periodic check (S1). When the Web server 2 or the network has recovered from the failure, and becomes normal as a result, the operation management program 10 releases a stopped or reduced operation (S6).

In the third embodiment described above, a previous check is performed to prevent a failure during a transaction by a customer, and even if a failure occurs during a transaction, the transaction can be continued or transition to the failure recovering processing, so that the failure will not cause a customer to wait for a long time, thus improving the customer service.

It should be noted that the aforementioned first embodiment can also perform the recovery processing similar to that described in the third embodiment by installing the operation management program 10 in the automatic transaction apparatus 1.

While in the respective embodiments described above, the automatic transaction apparatus is provided with the AP program 2*a* from the Web server 2, the present invention can also be applied to an automatic transaction system which is provided with only contents that constitute screens of the automatic transaction apparatus 1 from the Web server 2.

Also, while the present invention has been described for a system which provides operations related to a financial business using business applications placed on the Web server 2, which is downloaded through an automatic financial transaction device, the present invention is not limited to the automatic financial transaction device but may be implemented in a general automatic transaction apparatus (for example, systems placed in municipal offices or hospitals).

As described above, according to the present invention, even if a Web related failure occurs, such as a failure in a Web browser, a failure in a Web server, or the like, in the middle of a transaction, the transaction is transitioned to an application resident on the automatic transaction apparatus, thereby making it possible to avoid halting the automatic transaction apparatus.

Also, even if a Web related failure occurs in the middle of a transaction, information on the transaction so far processed may be saved, so that the AP program can be jumped to an appropriate location of the resident application to continue the transaction.

Further, by periodically checking the Web environment before starting a transaction, it is possible to obviate a Web failure immediately after starting a transaction or in the middle of a transaction.

Then, even if a web failure is detected before a transaction, down time of the automatic transaction apparatus can be minimized by rebooting the web browser or the entire system of the automatic transaction apparatus depending on the type of failure, and by checking the server at all times.

What is claimed is:

1. An automatic transaction system including a Web server and an automatic transaction apparatus connected to the Web server such that said automatic transaction apparatus downloads an application from said Web server to make transactions, said automatic transaction apparatus comprising:

an application resident therein for realizing transactions identical to transactions executed by the application downloaded from said Web server; and an information save area, wherein said application downloaded from said Web server is adapted to save information for continuing a transaction into said information save area, said automatic transaction apparatus switches to said resident application to make a transaction using information saved in said information save area when a Web related fault occurs.

2. An automatic transaction system according to claim 1, wherein said automatic transaction saves, as a transaction is being processed, information required for the application to execute the transaction, and passed said saved information to the resident application to continue the transaction when the application cannot be downloaded from said Web server.

3. An automatic transaction system according to claim 1, wherein the application downloaded is a Web-based application, and wherein the application resident is a non-Web-based application.

4. An automatic transaction system including a Web server and an automatic transaction apparatus connected to the Web server such that said automatic transaction apparatus downloads a Web-based application from said Web server to execute Web-based transactions, said automatic transaction apparatus comprising:

an application resident therein to execute non-Web-based transactions identical to the Web-based transactions executed by the Web-based application; and an information save area, wherein said Web-based application is adapted to save information for continuing a transaction into said information save area, said automatic transaction apparatus switches to executing said application resident therein to continue the Web-based transaction in a non-Web-based environment using information saved in said information save area when a Web related fault occurs.

5. An automatic transaction system according to claim 1, wherein said automatic transaction apparatus saves, as a Web-based transaction is being processed, information required for the Web-based application to execute the Web-based transaction, and passes saved information to said application resident therein to continue the Web-based transaction in a non-Web-based environment when the Web-based application cannot be downloaded from said Web server.

* * * * *